Patented Nov. 15, 1949

2,488,134

UNITED STATES PATENT OFFICE

2,488,134

SULFUR-CONTAINING AROMATIC COMPOUNDS

Louis A. Mikeska, Westfield, N. J., and Allen R. Kittleson, Washington, D. C., assignors to Standard Oil Development Company, a corporation of Delaware No Drawing. Application May 26, 1943, Serial No. 488,522

9 Claims. (Cl. 260—609)

This invention relates to the preparation of novel aromatic compounds containing sulfur, selenium or tellurium in a side chain, and more particularly to alkylated hydroxy benzyl mercaptans and their homologues and derivatives.

This application is a continuation-in-part of our copending application Serial No. 425,383, filed January 1, 1942, now issued as Patent Number 2,415,833, granted February 18, 1947.

The organic compositions herein described are particularly useful as additives for mineral lubricating oils used in internal combustion engines, in which they act as inhibitors of oxidation and deposition of varnsh on hot metal surfaces and as agents for promoting engine cleanliness generally.

The present invention involves the preparation of a broad new class of aromatic compounds which, as indicated above, may be referred to broadly as alkylated hydroxy benzyl mercaptans and the analogous compounds obtained by substituting sulfur, selenium or tellurium for oxygen in the hydroxyl group and by substituting selenium or tellurium for the sulfur of the mercaptan group, as well as derivatives obtained by substituting various organic groups or radicals containing organic groups for the hydrogen of the mercaptan group.

The new compositions may be defined more precisely as those having the general structure YAr(TX)RUZ in which Ar is an aromatic nucleus, which for illustration may be a benzene nucleus, biphenyl, naphthalene or the like, Y is an organic group such as an alkyl radical, an aryl, alphyl or cyclo-alkyl radical, which radicals may contain substituent groups, T is a negative element of group VI of the periodic table, X is hydrogen, an onium base residue or a metal equivalent, R is a hydrocarbon group, preferably the group —CH₂— or a short chained aliphatic group, U is sulfur, selenium or tellurium, and Z is hydrogen, a metal or an organic group or a radical containing an organic group. It is intended that the above formula represent a molecule containing one or more —TX radicals, one or more Y radicals and one or more —RUZ radicals of similar or different constitution attached to the same aryl nucleus. All such substituent radicals may be attached to the aryl nucleus in any position. When the aryl nucleus is a benzene ring, the other substituent radicals may be ortho, meta and/or para to each other and to the —TX radical. When Z is a radical, it may represent an alkyl radical, an alkyl xanthate radical, an alkyl thiophosphate, thiophosphite, phosphate or phosphite radical, a thiocarbamate radical, or the like. (Compounds in which Z of the above formula represents an organo-substituted thiophosphite or thiophosphate radical are claimed in copending application Serial Number 718,258, filed December 24, 1946.) The desired compounds are also characterized by sufficient carbon atoms in aliphatic linkages to produce oil solubility and preferably have at least 4 carbon atoms in alkyl groups in the molecule in compounds containing no metal atoms and at least 8 or 10 carbon atoms in alkyl groups in compounds which contain a metal atom, when the compounds are to be dissolved in mineral oils. The metals appearing in the —TX group may be any metals, but the preferred metals in compounds used as lubricating oil additives include the metals of groups II, III and VIII, such as magnesium, barium, calcium, cobalt, cadmium, nickel, tin, zinc, aluminum and the like. In a compound prepared with polyvalent metals, one valence bond may replace hydrogen in a phenolic hydroxyl or sulfhydryl group, and other valences may replace hydrogen in other similar groups of the same molecule or of other similar molecules (which may contain different substituents), or the remaining valence or valences may be linked to any suitable inorganic or organic radical. The onium bases which may appear in the place of metal include those of sulfur, phosphorus and nitrogen.

The new compounds of the above-described class, when Z of the general formula is hydrogen or a radical containing an organic group, may in general be prepared by reacting a compound of the structure YAr(TX)RV where Ar, —TX and R have the meanings given above and V is a halogen atom, with a compound of the structure WUZ, in which W is hydrogen or a metal, U is sulfur, selenium or tellurium and Z is hydrogen, an organic radical or a radical containing an organic group. When it is desired to form a compound in which Z is a metal, it is preferable to first prepare the corresponding compound in which Z is hydrogen, and to subsequently convert the latter into a metallic salt, for example, by reaction with a metallic base.

The complex mixtures of chlormethyl alkyl phenols prepared by the condensation of phenols with formaldehyde and hydrogen chloride represent a preferred class of intermediates for use in the preparation of the compounds of the present invention. The various components of these complex mixtures of chlormethyl alkyl phenols and of the resulting derivatives may also be separated from the complex product, or prepared in relatively pure form by any suitable methods and used similarly. The reaction between an alkyl phenol, formaldehyde and hydrogen chloride is aided by passing dry hydrogen chloride continuously through the reaction mixture when concontrated aqueous hydrochloric acid is used as an initial reagent. The reaction may also be conducted under anhydrous conditions, as illustrated in the following example:

*Example 1*

Dry HCl was passed through a suspension of 75 parts by weight of paraformaldehyde in 200 parts of an inert solvent such as benzene as rapidly as the HCl was absorbed at 25-35° C. for a period of 2-3 hours at atmospheric pressure. The resulting reaction mixture consisted chiefly of a benzene solution of the following chlorethers:

ClCH2OCH2Cl
ClCH2OCH2OCH2Cl
and
ClCH2OCH2OCH2OCH2Cl

To this mixture were added 206 grams of p-tert. octyl phenol and the reaction temperature increased to 50° C. The reactants were stirred at this temperature for a period of 2-3 hours, a slow stream of dry HCl being passed through the mixture in the meantime. The resulting mixture was washed free of unreacted formaldehyde by washing once with concentrated aqueous HCl and the excess HCl washed from the benzene layer by could water. After drying the washed benzene layer and removing the benzene at 70° C. under reduced pressure, a residual viscous oil (I) was obtained containing 12 to 15% chlorine.

The tertiary octyl phenol used in the examples of this invention was prepared by alkylation of phenol with diisobutylene. This alkylated phenol has also often been referred to as diisobutyl phenol, isooctyl phenol or tetramethylbutyl phenol.

The chlorine content of the products formed by such a reaction as that described in Example 1 may be controlled by the ratio of the formaldehyde and phenol used in the initial reaction. For example, when conducting the preparation as described in Example 1 with several different ratios of formaldehyde and para-tert.-octyl phenol, the chlorine contents of the products were observed to be as follows:

| Formaldehyde: Octyl Phenol, Mol Ratio | Product, per cent Cl/wt. |
|---|---|
| 1.0 | 2.7 |
| 1.5 | 8.7 |
| 2.0 | 11.9 |
| 2.5 | 13.5 |
| 3.0 | 14.2 |

The products of about 12% to about 14% chlorine content are generally preferred, although the other products of lower and higher chlorine content may also be used in this invention.

Among the compounds present in the products from this reaction are the following:

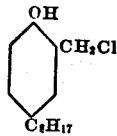

o-Chlormethyl p-tert. octyl phenol

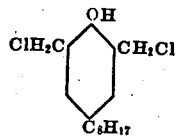

2,6-di(chlormethyl) 4-tert. octyl phenol

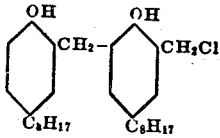

Chlormethyl bis(tert. octyl hydroxy phenyl) methane, and

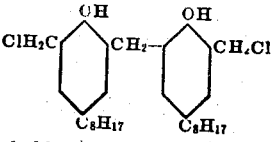

Bis(tert octyl chlormethyl hydroxy phenyl) methane

Thus these compounds are considered to have the following general formula

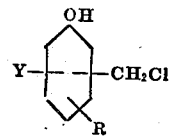

in which the substituent groups may be attached at any position in the aryl nucleus indicated diagrammatically by the hexagon, R represents a hydrocarbon group of one or more carbon atoms and preferably an alkyl group of 4 or more carbon atoms, and Y represents hydrogen or an organic radical, especially an alkyl, aryl or aralkyl radical which may in turn contain substituent groups. It is to be understood that such individual compounds may also be prepared by any other suitable method, and may be used individually and in mixtures as lubricating oil improving agents. These individual compounds may likewise be employed as intermediates in the methods described herein for the preparation of lubricating oil improving agents and other compositions according to the present invention.

The individual chlorethers described above may be separated from the mixed product, or prepared by any suitable methods, and then condensed with alkyl phenols to prepare lubricating oil improving agents. Other chlorethers, such as chlormethyl ethyl ether, may also be used. The condensation of the alpha chlorethers and alkyl phenols may also be conducted with suitable catalysts such as stannic chloride or anhydrous zinc chloride. Also, the alkyl phenol may be dissolved in an equivalent amount of alcohol. The mixture is then saturated with HCl. Under this procedure, the reaction is easily controlled in such a way as to yield products of uniform chlorine content.

The segregation of fractions of the product of Example 1 and the preparation of other derivatives of the alkyl oxybenzyl structure are illustrated in the following examples.

Example 2

The viscous oil product obtained as described in Example 1 was diluted with several volumes of petroleum ether. On cooling this mixture to about 0° C., a white solid (representing about 30% of the crude product) crystallized out. This product was analyzed and found to be bis (2-hydroxy 3-chlormethyl 5-tert.-octyl phenyl) methane (II), represented by the formula

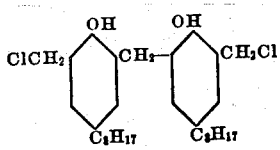

Analysis

|  | Theory | Found |
|---|---|---|
| Percent Cl | 13.65 | 13.50 |
| Percent C | 71.44 | 71.31 |
| Percent H | 8.92 | 8.88 |

Example 3

A procedure essentially the same as that used in Example 1 was followed except that 221 parts by weight of p-tert. octyl phenol sulfide were used in place of the phenol. The resulting product (III) contained from 6 to 7.5% chlorine, which indicates it to consist largely of chlormethyl bis(tert. octyl hydroxy phenyl) sulfide:

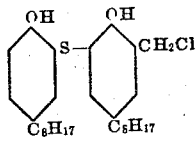

A method of preparing the alkyl hydroxy benzyl derivatives in relatively pure form involves reacting the alkyl phenol with formaldehyde in an aqueous alkaline vehicle. This is illustrated in the following example:

Example 4

1,236 grams (6 mols) of p-tert. octyl phenol were added to a solution of 2,000 cc. of water and 800 cc. of methyl alcohol containing 250 grams (6.25 mols) of NaOH. 1,314 grams of aqueous formaldehyde (Formalin, 37% CH₂O) were added to the phenolate solution at room temperature and the mixture allowed to stand for three days. The reaction mixture was then acidified with a small excess of dilute aqueous HCl. The di(hydroxymethyl) alkyl phenol separated out in an oily layer which was taken up in a 50/50 mixture of U. S. P. ethyl ether and petroleum ether. The ether layer was washed twice with water, dried, and the solvent removed at 70° C., the last trace being stripped off under reduced pressure. The residue was a light straw colored viscous oil which crystallized on standing. 1,360 grams were recovered. The analysis indicates this to be 2,6-di-(hydroxy methyl) 4-tert. octyl phenol (IV):

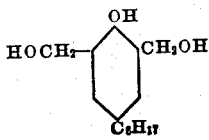

Analysis

|  | Theory | Found |
|---|---|---|
| Percent C | 72.18 | 72.16 |
| Percent H | 9.77 | 9.96 |

Example 5

A solution of 40 grams NaOH in 250 cc. of water was added to a solution of 221 grams (0.5 mol) of tert. octyl phenol sulfide in 350 cc. of dioxan. To this mixture were added 122 grams of Formalin (37% CH₂O, 1.5 mols) at room temperature. The reactants were allowed to stand for four days, after which the mixture was acidified and extracted as in Example 4. There were then recovered 225 grams of a viscous straw colored oil which, upon analysis, was determined to be bis-(hydroxy methyl tert. octyl phenol) sulfide (V):

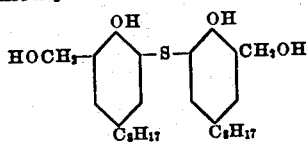

Analysis

|  | Theory | Found |
|---|---|---|
| Per cent C | 71.71 | 72.25 |
| Per cent H | 9.16 | 10.10 |
| Per cent S | 6.37 | 6.22 |

Similar disulfides may be prepared by substituting the alkyl phenol disulfide in place of the mono-sulfide in the above described reaction.

The hydroxy benzyl alcohols may be readily converted to the corresponding chlorides as illustrated in the following example:

Example 6

200 grams of (IV) were diluted with 100 cc. of naphtha. Dry HCl gas was bubbled through the solution at room temperature for 8 hours. The aqueous layer formed was removed and the naphtha layer washed twice with ice and water, dried with calcium chloride and a portion of the solvent allowed to evaporate off. 164 grams of a crystalline product separated out. This product melted between 70 and 75° C. and was determined by analysis to be largely di(chlormethyl) tert. octyl phenol (VI):

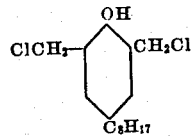

Analysis

|  | Theory | Found |
|---|---|---|
| Per cent C | 63.36 | 63.68 |
| Per cent H | 7.92 | 8.46 |
| Per cent Cl | 23.4 | 20.4 |

The intermediates prepared by the above or other suitable methods may be reacted with various sulfur compounds, or analogous compounds containing selenium or tellurium, to produce the novel compositions of the present invention. Suitable reagents for introducing the sulfur radical into the aromatic side chain include, for example, hydrogen sulfide, alkali metal sulfides, alkali metal hydrosulfides, alkyl mercaptans, metal alkyl mercaptides, metal alkyl xanthates, metal alkyl thiophosphates and the like. These compounds may generally be reacted by simply heating in the presence of the phenolic or similar compound, which is dissolved in a suitable solvent, such as ethyl alcohol or methyl alcohol.

Examples of the preparation of new compounds by the methods of the present invention using the intermediates described above, are given below.

Example 7

4.6 grams (0.2 mol) of metallic sodium were reacted with 100 cc. of absolute ethyl alcohol in a flask equipped with stirrer and reflux condenser. 71.5 grams (0.2 mol) of dioctyl dithiophosphoric acid were added to the sodium alcoholate solution.

To the alcoholic solution of sodium dioctyl dithiophosphate were added 27.9 grams of di(chlormethyl) tert. octyl phenol (VI). The reaction mixture was then refluxed for 1½ hours, after which it was poured into water, acidified, and extracted with ether. The ether layer was washed several times with water, dried over sodium sulfate and the ether stripped off.

The phenolic derivative thus obtained was converted to the sodium salt by adding 43.7 grams of the former to 1.15 grams of sodium in 40 cc. of absolute ethyl alcohol. The sodium phenolate thus formed was treated with a solution of 2.5 grams of anhydrous Ca(NO₃)₂ in 40 cc. of acetone to obtain the calcium salt. The NaNO₃ was filtered off and the alcohol stripped off at 100° C. under reduced pressure. The residue was taken up in petroleum ether and again filtered. The petroleum ether was stripped from the filtrate, giving a yellow viscous oil (VII), which was believed upon analysis to consist largely of a product having the following structure:

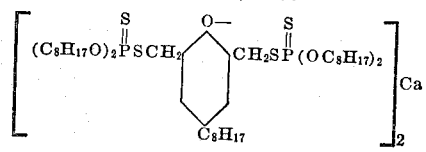

*Analysis*

|  | Theory | Found |
|---|---|---|
| Per cent Ca | 2.40 | 1.54 |
| Per cent S | 13.4 | 11.7 |

Example 8

18.4 grams of metallic sodium (0.8 mol) were reacted with 400 cc. of absolute ethyl alcohol. To this sodium ethylate solution were added 83.2 grams (0.8 mol) of amyl mercaptan. The resultant alcoholic solution of sodium amyl mercaptide was cooled to about 10° C., after which a solution of 104 grams of (II) in 200 cc. of dioxan were added. The reaction mixture was refluxed for 1½ hours, after which it was allowed to stand at room temperature overnight. The product was then neutralized by pouring over cracked ice in dilute HCl. The oily layer which separated was extracted with ether and the ether layer washed several times with water. The ether solution was dried over CaCl₂ and the solvent and excess mercaptan removed at 100° C. under reduced pressure. 126 grams of a straw colored viscous oil were thus obtained.

To prepare the barium salt, 105 grams of the above product in about 600 cc. of toluene were added to 57 grams of Ba(OH)₂8H₂O dissolved in 150 cc. of methyl alcohol. The reaction mixture was refluxed, the methyl alcohol and water of reaction being removed from the mixture by means of a trap. After all the water had been removed, the toluene solution was filtered to remove BaCO₃ and unreacted Ba(OH)₂. The filtrate was stripped free of solvent at 100° C., reduced pressure being used to remove the last traces.

111 grams of a straw colored pulverizable solid (VIII) were thus obtained. This product was indicated by analysis to have the following structure:

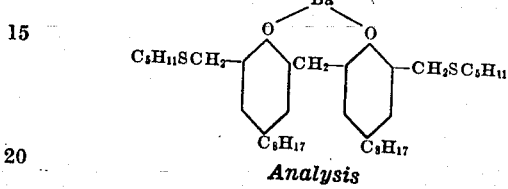

*Analysis*

|  | Theory | Found |
|---|---|---|
| Per cent S | 8.10 | 7.85 |
| Per cent Ba | 17.30 | 14.71 |

Example 9

133 grams (0.5 mol) of (IV), 150 grams (1.5 mols) of amyl mercaptan and 300 cc. of xylene were placed in a flask equipped with heater, stirrer, reflux condenser and water trap. The mixture was refluxed, trapping off the water of reaction. After 3 hours a total of 17 cc. of H₂O were recovered and the reaction discontinued. The xylene and excess amyl mercaptan were removed at 110° C. under reduced pressure. 223 grams of a straw colored oil (IX) were recovered. This was indicated by analysis to consist principally of di(amyl thiomethyl) tert. octyl phenol:

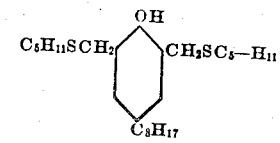

*Analysis*

|  | Theory | Found |
|---|---|---|
| Per cent S | 14.60 | 14.94 |
| Per cent C | 71.23 | 70.71 |
| Per cent H | 10.50 | 10.72 |
| Acetyl No | 116 | 119 |

Example 10

8 grams (⅓ mol) of metallic sodium were reacted with 200 cc. of absolute ethyl alcohol. To this sodium alcoholate solution were added 146 grams (⅓ mol) of (IX) followed by 53 grams of BaBr₂ dissolved in 200 cc. of methyl alcohol. The reaction mixture was refluxed for two hours, after which the alcohols were distilled off. The residue was diluted with petroleum ether and filtered to remove the NaBr. The filtrate was stripped free of solvent, leaving a very viscous oil residue (X), which was indicated by analysis to be essentially the barium salt of di(amyl thiomethyl) tert. octyl phenol:

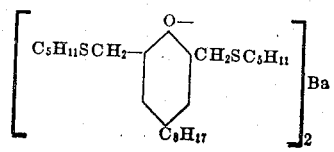

Analysis

|                | Theory | Found |
|----------------|--------|-------|
| Per cent S     | 12.67  | 12.43 |
| Per cent Ba    | 10.0   | 13.4  |

Example 11

30 grams of (VI) were added to a solution obtained by passing H₂S into an alcoholic solution of NaOH and believed to consist largely of a solution of NaSH, and stirred for about one hour. The mixture was acidified, diluted with water and extracted with 50/50 mixture of U. S. P. ethyl ether and petroleum ether. The ether layer was washed several times with water, dried, and the solvent stripped off. The residue was taken up in petroleum ether and cooled to about 0° C. About 8 grams of a crystalline precipitate formed (XI—A) which was filtered off. The filtrate was stripped free of solvent, leaving a semisolid resinous product (XI).

Analysis

|              | XI   | XI—A |
|--------------|------|------|
| Per cent S   | 16.1 | 16.3 |

The crystalline compound XI—A is considered to be chiefly the mercaptan.

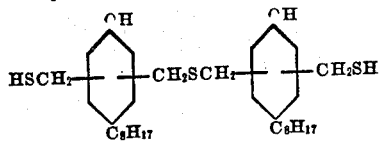

and may also contain a compound of the simpler structure

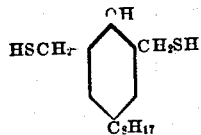

and the resinous substance XI is considered to be a polymeric form of the formula.

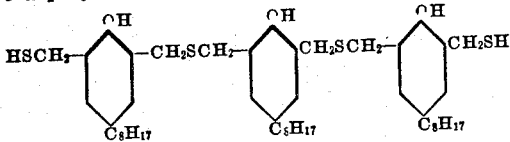

and may alternatively, or in addition, contain a disulfide product containing the structural unit

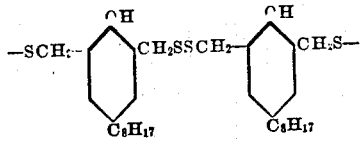

Example 12

125 grams of (V), 40 grams of amyl mercaptan, 400 cc. of toluene and one gram of p-toluene sulfonic acid were reacted as in Example 9. There were thus recovered 133 grams of a dark viscous oil (XII), which is considered, in view of the analysis, to have the structure —

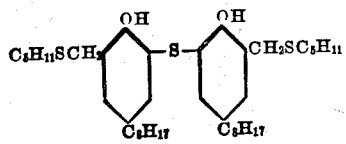

Analysis

Per cent S, theory, 14.2; found, 12.4.

Example 13

150 grams of (IV), 72 grams of refinery mercaptans (boiling range 26–80° C., derived from petroleum oils and consisting mostly of methyl, ethyl and propyl mercaptans) and one gram of p-toluene sulfonic acid were charged to a stainless steel bomb. The bomb was heated to 110–120° C. for a period of 2 hours, after which the reaction product was isolated by diluting with a solvent such as petroleum ether, followed by water washing to remove the p-tuolene sulfonic acid, drying and finally stripping off the solvent. 182 grams of a straw colored oil (XIII) were recovered, having the following analysis:

Analysis of product

| Per cent C | 69.46 |
|------------|-------|
| Per cent H | 10.00 |
| Per cent S | 15.71 |

Example 14

The Ba salt of (XIII) was prepared by the process described in Example 8, adding 60 grams of Ba(OH)₂.8H₂O dissolved in 200 cc. of methyl alcohol to 115 grams of (XIII) dissolved in 400 cc. of toluene. There were recovered 117 grams of a light straw colored pulverizable solid (XIV) having the analysis —

Analysis of product

| Per cent Ba | 15.2 |
|-------------|------|
| Per cent S  | 12.4 |

Example 15

50.8 grams of the mixture of chlormethyl tert.-octyl phenols (I) obtained as the product in Example 1 were dissolved in 50 cc. of absolute ethyl alcohol and added slowly from a dropping funnel to a stirred solution of 22.0 grams of K₂S in ethyl alcohol. After all of the chloride was added, the solution was refluxed for 2 hours. The alcoholic solution was then poured into ice and water and extracted with ether. The ether layer was washed once with dilute HCl, then water, then dried over Na₂SO₄ and the ether stripped off under reduced pressure to remove the last traces. There were recovered 42 grams of a straw colored oil containing 8.4% sulfur. This is considered to have chiefly the structure —

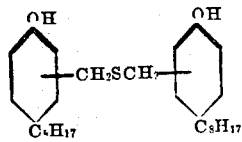

The barium derivative was prepared as in Example 8, using 36 grams of the above sulfide, 200 cc. xylene, 23 grams Ba(OH)₂8H₂O, and 200 cc. methyl alcohol. There were recovered 46 grams of a yellowish pulverizable solid (XV) containing 17.1% barium.

Example 16

50.8 grams of the mixture of chlormethyl tert.-octyl phenols (I) in 100 cc. of dioxan were added dropwise to a stirred solution of 60 grams of potassium ethyl xanthate in 250 cc. of dioxan. After all of the chloride was added, the mixture was stirred for several hours at room temperature. The dioxan solution was poured into water and extracted with ether. The ether layer was washed once with dilute acid followed by several water washes, then dried over Na₂SO₄ and the ether stripped off.

There were recovered 59 grams of a reddish oil (XVI) containing 18.2% sulfur which was a complex mixture of xanthates of chlormethyl tert.-octyl phenols. The reaction with respect to the simpler components may be indicated by the following general equation:

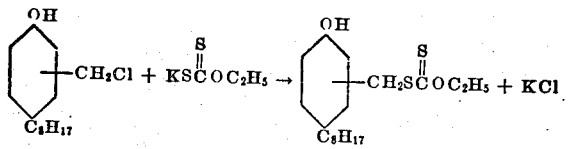

*Example 17*

100.8 grams of KOH were dissolved in 900 cc. of absolute ethyl alcohol and H₂S added until 61.2 grams were absorbed. To this solution of KSH were added slowly with stirring 152.4 grams of the mixture of chlormethyl tert.-octyl phenols (I) dissolved in 300 cc. of absolute ethyl alcohol. The mixture was stirred at room temperature for 2 hours and then at 80° C. for 3 hours. The solution was then poured into ice and water; acidified with HCl, extracted with ether and the extract washed with water, dried over Na₂SO₄, and the ether finally removed at 100° C. There were recovered 132 grams of a light colored soft resin.

The barium salt was prepared by the procedure followed in Example 8, using 50.4 grams of the above resinous product, 300 cc. of xylene, 200 cc. of methyl alcohol and 63 grams of Ba(OH)₂8H₂O. There were recovered 64 grams of a yellow powder (XVII) containing 17.4% barium.

*Example 18*

36.8 grams (1.6 mols) of sodium were added to 500 cc. of absolute ethyl alcohol in a 2-liter round bottomed flask equipped with a stirrer, dropping funnel and reflux condenser. To the sodium alcoholate solution were added 168.4 grams of amyl mercaptan, after which the reaction mixture was cooled to 0–5° C. and stirred while adding 203 grams of the mixture of chlormethyl tert.-octyl phenols (I) in 100 cc. of dioxan over a period of 30 minutes. The mixture was stirred for an additional hour at refluxing temperature, after which the reactants were poured onto ice, acidified with HCl, extracted with ether and the extract washed with water, dried and the solvent and excess mercaptan removed at 100° C. under reduced pressure. There were recovered 239 grams of a straw colored oil containing 10.9% of sulfur. This product was converted to the barium salt (XVIII) by the same process used in Example 8. The reactions involved are illustrated with respect to one of the chlormethyl tert.-octyl phenols as follows:

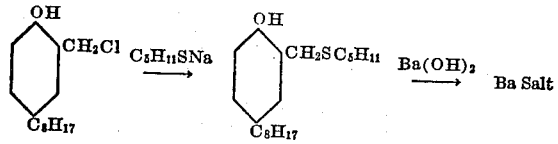

*Example 19*

The mixed xanthates (XVI) described in Example 16 were treated in absolute ethyl alcohol solution with sodium ethylate to prepare the corresponding sodium salts. To the solution of the resulting sodium phenolate derivatives was added an absolute ethyl alcohol solution containing about 14% of calcium chloride. The reaction mixture was then diluted with naphtha, the sodium chloride precipitate filtered off and the filtrate evaporated to dryness under reduced pressure to obtain the calcium salt (XIX) which is indicated with respect to one of the simpler components of the mixture as having the formula—

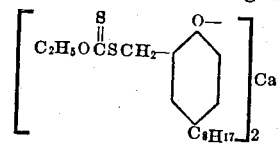

*Example 20*

A solution of the sodium salt of cardanol (phenol derived from cashew nut shell liquid) was prepared by adding 80 grams NaOH in 500 cc. water to 576 grams of cardanol in 300 cc. of dioxan. 486 grams of Formalin (37% CH₂O) were added to the phenolate solution at room temperature and the mixture allowed to stand for 4 days. The hydroxy-methyl derivative was recovered by the method described in Example 4. A stainless steel bomb was charged with 116 grams of this hydroxymethyl cardanol product, 110 grams of refinery mercaptans and 1 gram of p-toluene sulfonic acid. The bomb was heated to 100–110° C. for 5 hours, after which the product was removed, diluted with naphtha, washed several times with water, dried, and the solvent stripped off. 120 grams of a dark viscous oil (XX) were recovered which contained 12.1% sulfur. The reaction may be indicated by the following general formula sequence:

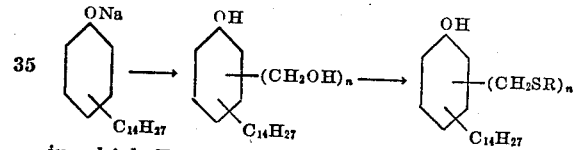

in which R represents the organic radical of the refinery mercaptans (described in Example 13) and $n$ is 1 or 2.

*Example 21*

420 grams of a mixture of phenols extracted from a petroleum oil distillate and having an average molecular weight of 141 were dissolved in 300 cc. of dioxan and mixed with a solution of 120 grams of sodium hydroxide in 600 cc. of water. 608 grams of Formalin solution (37% CH₂O) were then added and the mixture allowed to stand at room temperature for 4 days. The reaction mixture was then treated by the method described in Example 4 to recover the hydroxymethyl derivatives. This product was converted to the alkyl thiomethyl derivative by the process described in Example 20, using 120 grams of the hydroxymethyl "petroleum phenols," 100 grams of the same refinery mercaptans and 1 gram of p-toluene sulfonic acid. The resulting product was a reddish mobile oil (XXI) containing 14% sulfur.

In addition to the compounds prepared by the methods of the above examples, many other derivatives of the chlormethyl alkyl phenols may be prepared and used as improving agents for lubricating oils or for other purposes. Examples of some of these derivatives are given below in a list of reactions which will serve as brief outlines of methods suitable for their preparation. While these preparations are generally applicable to the complex mixtures of the chlormethyl alkyl phenol products obtained by a reaction of phenols, aldehydes and hydrogen chloride as described above, the preparations may also be carried out with the individual chlormethyl derivatives of phenols however prepared. Such derivatives may contain one or more chlormethyl groups attached to a single aryl nucleus and preferably contain an alkyl group, R, attached to the aryl nucleus. This alkyl group contains preferably at least 4–8 or more carbon atoms. Preparations are illustrated with respect to one of the chlormethyl alkyl phenols as follows:

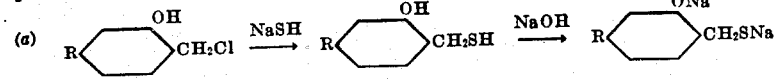

Other metal atoms or hydrogen may be substituted for one or both of the sodium atoms.

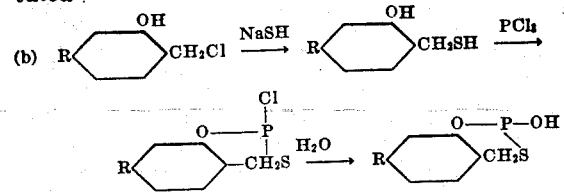

A metal atom may be substituted for the hydroxyl hydrogen atom.

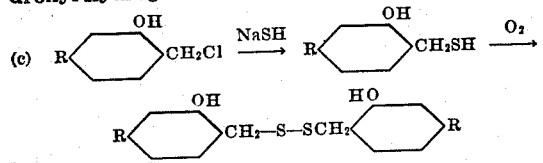

Metal atoms may be substituted for one or both of the hydroxyl hydrogen atoms.

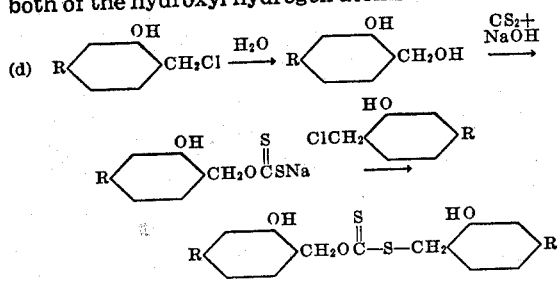

Metal atoms may be substituted for one or both of the hydroxyl hydrogen atoms.

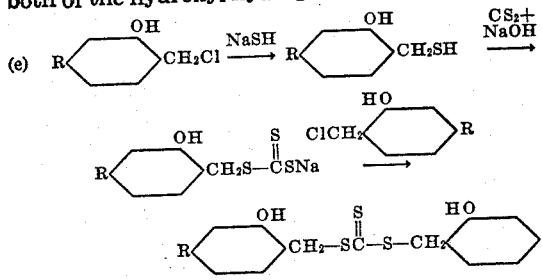

Metal atoms may be substituted for one or both of the hydroxyl hydrogen atoms.

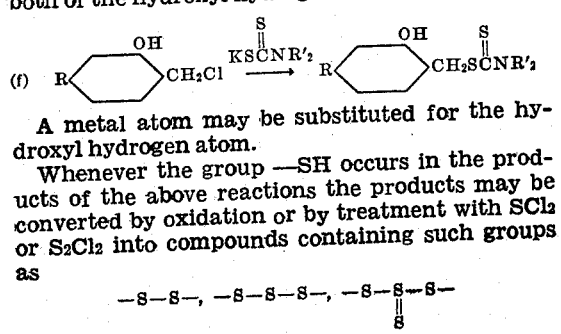

A metal atom may be substituted for the hydroxyl hydrogen atom.

Whenever the group —SH occurs in the products of the above reactions the products may be converted by oxidation or by treatment with $SCl_2$ or $S_2Cl_2$ into compounds containing such groups as

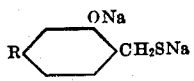

and the like.

Although very satisfactory procedures for preparing compounds of this invention have been described with reference to the use of chlormethyl alkyl phenols prepared by condensing an alkyl phenol, an aldehyde and hydrogen chloride, it is to be understood that other procedures may be employed for preparing similar hydroxy alkyl halides for use as intermediates in the above described process. In the alternate procedures the order of the reaction steps may be changed and other similar reactants may be used. For example, it may be desired to alkylate the base or the base derivatives of the phenol condensation product, e. g., with an alkylating agent such as diethyl sulfate, an alkyl halide, an alcohol, a ketone, or an olefin by known alkylating methods and reduction by hydrogen, if needed or desired.

The phenols used in any of the above-described processes include generally all nuclearly hydroxylated aromatic compounds having phenolic properties and a readily replaceable nuclear hydrogen atom which is preferably ortho or para to the hydroxyl group. Phenols extracted from the petroleum oils may be used as obtained or after alkylation to prepare the chlormethyl derivatives. Also, naturally occurring phenols such as those found in vegetable oils, viz., cardanol, obtained from cashew nut shells, may be used. As indicated above, it is preferred that the phenols contain an alkyl group of at least one carbon atom attached to the nucleus. This group may be introduced by alkylating any of the above-described phenols which do not already contain suitable alkyl groups. The alkyl phenols may be prepared by alkylation of phenol with olefins, including mixtures of olefins such as those obtained in cracked petroleum fractions and by alkylation of phenols with alkyl halides, including chlorinated paraffin wax and chlorinated petrolatums derived from petroleum. Such chlorinated waxes may contain dichlorides and polychlorides and may be used in alkylating phenols by the customary Friedel-Crafts type synthesis to give complex alkylated phenols of high molecular weight in which several phenol radicals are linked by alkyl radicals in a single molecule. These high molecular weight complex alkyl phenolic products, when used in the reactions described herein, give products which are effective in reducing the pour point of waxy oils and in raising the viscosity index of lubricating oils as well as in improving their lubricating properties, such as oiliness, film strength, and stability and resistance to oxidation.

It is not intended that this invention be limited to any of the particular examples, which have been presented only for the purpose of illustration, but it is intended that the invention be limited solely by the terms of the appended claims.

It is claimed:

1. As a new composition of matter a compound possessing the structure—

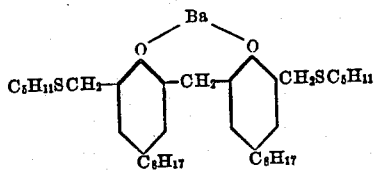

2. The process of preparing a novel composition of matter useful as a mineral lubricating oil additive which comprises reacting an alkylated phenol with formaldehyde in the presence of hydrogen chloride and further reacting the product thus formed with an alkyl mercaptan.

3. As a new composition of matter an aromatic-methylene alkyl thioether containing at least one substituent linked to an aromatic nucleus selected from the group consisting of hydroxyl radicals and metal substituted hydroxyl radicals and at least one alkyl substituent linked to the aromatic nucleus and containing at least four carbon atoms.

4. The method of preparing an aromatic methylene thioether containing at least one substituent linked to an aromatic nucleus selected from the group consisting of hydroxyl and metal substituted hydroxyl radicals which comprises reacting an aromatic methylene halide having at least one substituent linked to the aromatic nucleus and selected from the group consisting of hydroxyl and metal substituted hydroxyl radicals with an alkyl mercaptide.

5. As a new composition of matter an aromatic methylene amyl thioether containing at least one substituent linked to an aromatic nucleus selected from the group consisting of hydroxyl radicals and metal substituted hydroxyl radicals and an alkyl substituent linked to the aromatic nucleus, said alkyl substituent containing at least 4 carbon atoms.

6. A composition according to claim 5 in which the aromatic methylene amyl thioether contains a barium substituted hydroxyl radical.

7. As a new composition of matter a barium salt of an aromatic methylene amyl thioether containing a hydroxyl group linked to a benzene nucleus, said nucleus also having a substituent tertiary octyl radical.

8. A process according to claim 2 in which the alkylated phenol is an octyl phenol and in which the alkyl mercaptan is amyl mercaptan.

9. A process according to claim 4 in which the aromatic methylene halide is a chlormethyl octyl phenol, and in which the alkyl mercaptide is sodium amyl mercaptide.

LOUIS A. MIKESKA.
ALLEN R. KITTLESON.

REFERENCES CITED

The following references are of record in the file of this patent:

UNITED STATES PATENTS

| Number | Name | Date |
|---|---|---|
| 2,111,260 | Brunner | Mar. 15, 1938 |
| 2,223,693 | Martin et al. | Dec. 3, 1940 |
| 2,249,626 | Cook et al. | July 15, 1941 |
| 2,322,376 | McCleary | June 22, 1943 |

FOREIGN PATENTS

| Number | Country | Date |
|---|---|---|
| 450,760 | Great Britain | July 20, 1936 |

OTHER REFERENCES

Manchot: "Annalen," vol. 345, pp. 322-3.
Baumann: "Berichte," vol. 24, p. 1446.